United States Patent
Hoes et al.

(10) Patent No.: US 8,810,843 B2
(45) Date of Patent: Aug. 19, 2014

(54) METHOD FOR GENERATING DIGITAL IMAGING DATA, AND RASTER IMAGE PROCESSOR

(71) Applicant: Heidelberger Druckmaschinen AG, Heidelberg (DE)

(72) Inventors: Thorsten Hoes, Malterdingen (DE); Michael Kaiser, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/039,010

(22) Filed: Sep. 27, 2013

(65) Prior Publication Data

US 2014/0022566 A1 Jan. 23, 2014

Related U.S. Application Data

(63) Continuation of application No. 10/855,094, filed on May 27, 2004, now abandoned.

(30) Foreign Application Priority Data

May 28, 2003 (DE) .................................. 103 24 211

(51) Int. Cl.
 *G06F 3/12* (2006.01)
(52) U.S. Cl.
 USPC ......... 358/1.15; 358/1.2; 358/1.18; 358/1.14; 358/507
(58) Field of Classification Search
 CPC ................................. H04B 1/3872; G06T 3/00
 USPC ............. 358/1.2, 1.12, 1.13, 1.14, 1.15, 1.18, 358/464, 517, 401; 382/293, 291, 175; 348/580
 See application file for complete search history.

(56) References Cited

U.S. PATENT DOCUMENTS

| | | | | |
|---|---|---|---|---|
| 4,720,750 A * | 1/1988 | Watanabe | ...................... | 347/129 |
| 4,837,635 A * | 6/1989 | Santos | .......................... | 358/401 |
| 5,515,481 A * | 5/1996 | Pardo | ........................... | 358/1.18 |
| 5,528,194 A * | 6/1996 | Ohtani et al. | .................. | 382/293 |
| 5,964,156 A * | 10/1999 | Smith et al. | .................... | 101/471 |
| 5,988,899 A * | 11/1999 | Benson et al. | .................. | 400/61 |
| 6,029,576 A * | 2/2000 | Fischer et al. | ................ | 101/485 |
| 6,055,064 A * | 4/2000 | Lifshitz et al. | ................. | 358/1.9 |
| 6,088,710 A * | 7/2000 | Dreyer et al. | ................. | 715/246 |
| 6,441,920 B1 * | 8/2002 | Smith | ............................ | 358/1.2 |
| 6,771,384 B1 * | 8/2004 | Laverty et al. | ............... | 358/1.15 |
| 7,882,783 B2 * | 2/2011 | Kaiser et al. | .................. | 101/467 |
| 2002/0171871 A1 * | 11/2002 | Catt et al. | ..................... | 358/1.18 |
| 2003/0043414 A1 * | 3/2003 | Brady | ........................... | 358/3.06 |
| 2003/0202203 A1 * | 10/2003 | Fuse | .............................. | 358/1.14 |
| 2004/0064786 A1 * | 4/2004 | Ikeda et al. | .................... | 715/500 |
| 2004/0239960 A1 * | 12/2004 | Hoes et al. | ..................... | 358/1.2 |

\* cited by examiner

*Primary Examiner* — Dennis Dicker
(74) *Attorney, Agent, or Firm* — Davidson, Davidson & Kappel, LLC

(57) ABSTRACT

A method for generating digital imaging data for an imaging unit, in which digital imaging data are defined from a signature of input image data, in that a section of the signature corresponding to the imaging format of the imaging unit is processed (24) into a raster image by a raster image processor, the section being defined on the basis of geometric parameters of an image area of the input image data. A raster image processor for implementing the method includes a raster-image-processor program having at least one section, in which geometric parameters for defining the section to be processed, are assigned (16) to input variables for the rasterization.

15 Claims, 2 Drawing Sheets

METHOD FOR GENERATING DIGITAL IMAGING DATA, AND RASTER IMAGE PROCESSOR

This is a continuation of U.S. application Ser. No. 10/855,094, filed May 27, 2004, which claims the benefit of German Patent Application No. 103 24 211.2, filed May 28, 2003, both of which are hereby incorporated by reference herein.

BACKGROUND INFORMATION

The present invention is directed to a method for generating digital imaging data for an imaging unit, in which digital imaging data are defined from a signature of input image data, in that a section of the signature corresponding to the imaging format of the imaging unit is processed into a raster image by a raster image processor. In addition, the present invention is directed to a raster image processor having a raster-image-processor program, for implementing the method according to the present invention.

In the graphics industry, various imaging devices exist which can be used to selectively modify the properties or the structure of a surface area, directly at the machine level, in accordance with digital imaging data, in order to prepare a printing form for a specific printing process. In principle, one distinguishes between so-called computer-to-press systems and computer-to-plate systems: In a computer-to-press system, a printing form or a printing-form precursor is directly imaged in a print unit of a printing press on the basis of digital imaging data. A print unit of this kind, which encompasses an imaging unit, is also described as a direct on-press imaging print unit. In a computer-to-plate system, a printing form or a printing-form precursor is imaged independently of a printing press, in a prepress unit on the basis of digital imaging data. Such a prepress unit can also be described as a printing-form imagesetter. However, in computer-to-press and computer-to-plate systems, the imaging results of a signature (of a sheet) of input image data deviate in size from one another.

When a computer-to-plate system is used, in principle, a complete printing form, i.e., an entire area including the non-printing regions, is imaged. Consequently, this means that all geometric specifications pertaining to the signature (of the imposition sheet) refer to the complete printing form. In contrast, in direct on-press imaging print units, in principle, it is only the maximum printing format (the maximally imageable surface of the printing form) that can be imaged. However, since the maximum printing format is always only a true partial area of a printing form, a record of digital imaging data for a computer-to-press system is always larger than a record of digital imaging data for a computer-to-plate system. Therefore, digital computer-to-plate imaging data cannot be used on a direct on-press imaging print unit without adaptations being made. In the event of a job order change—even within one format class of printing presses—from a conventional printing press (for example a Speedmaster 74 press of Heidelberger Druckmaschinen AG) to a direct on-press imaging printing press (for example of a Speedmaster 74 DI press of Heidelberger Druckmaschinen AG), it is disadvantageous that the signature to be imaged must be completely recreated, because of the different geometries mentioned above. A further restriction is seen in that information pertaining to the geometry of a signature for imaging in a direct on-press imaging print unit cannot be used directly in a print-finishing unit, but, at best, only after adaptations are made.

It should also be mentioned that, increasingly, printing-form imagesetters come equipped with supplementary devices, such as automatic printing-form cutting dies, so that the imageable format can be smaller than the complete printing form surface. Consequently, the maximum sizes of the records of digital imaging data differ among various printing-form imagesetters, so that it is not possible to exchange digital imaging data without making adaptations to the particular computer-to-plate system.

In present-day raster image processors for direct on-press imaging print units or for direct on-press imaging printing presses, there are limitations to the processing of very large records of digital imaging data: Typical reactions of the raster image processor are an abnormal termination of the processing, an automatic scaling of the imaging data, or an arbitrary trimming to a maximum imaging format of the direct on-press imaging print unit or of the direct on-press imaging printing press. All of these reactions lead to an unsuitable result. As a rule, a scaling in unacceptable, since the size of the product to be printed inevitably changes. An automatic trimming is likewise unsuitable, since, in computer-to-plate systems, this step is dependent on the defined imaging zero reference point, typically at a plate corner, while in computer-to-press systems, the printing form is always centrically positioned. Because of the different reference points resulting therefrom, the information to be printed is also cropped, making the result unusable.

The European Patent Application EP 1 258 828 A2, related to U.S. Patent Application No. 2002/0171871, both of which are hereby incorporated by reference herein, describes a raster image processing system. In this system, output pages are generated for a number of different output units, such as printers, proofers, filmsetters, imagesetters, direct on-press imaging systems and the like. Page raster data and press sheet templates are processed into output pages, the press sheet templates including information on position, orientation, image area and offset parameters. In a raster image processor, these data are extracted, so that the press sheet templates can be used for the image data. The press sheet templates can be displayed, defined, and modified by the user, in particular on a monitor. The information regarding the location where the press sheet is to be positioned can be used for output on different printing formats. Generally usable press sheet templates can be stored. The disadvantage of the described processing system is, inter alia, that sections are only defined for imaging after the image data have already been fully rasterized. Therefore, only output units having the same resolution can be used.

SUMMARY OF THE INVENTION

An object of the present invention is to enable digital image data to be imaged on a computer-to-plate system or a computer-to-press system, without the need for any modifications or adaptations. An alternate or additional object is to eliminate the need for recreating digital imaging data.

In accordance with the present invention, the method for generating digital imaging data for an imaging unit includes at least the following steps: From a signature of input image data, digital imaging data are defined, in that a section of the signature corresponding to the imaging format of the imaging unit is processed into a raster image by a raster image processor. The section, in particular its position and/or its dimension, is defined on the basis of geometric parameters of an image area (or of a print image) of the input image data.

The method according to the present invention advantageously enables signatures to be processed for larger formats, given a suitable image area or suitable print image. Larger records of input image data for computer-to-plate systems may be directly processed, without modification, using computer-to-press systems. In the process, the information to be printed is retained, although the section is smaller than the entire size of the input image data. The need is eliminated for additionally generating digital imaging data. The method according to the present invention renders possible a rapid and flexible processing of input image data, independently of their format. In the process, no original layout data are needed. No output-dependent intermediate format is produced. A time savings is realized in the processing of data by the method of the present invention.

In particular, the geometric parameters may be stored in the raster image processor. The defined geometric parameters, which may also be described as trimming parameters, may be stored in the raster image processor, so that the geometric parameters may be assigned to further computer-to-plate input image data of comparable size, enabling a section to be automatically determined in the raster image processor on the basis of the defined geometric parameters.

Alternatively or in addition thereto, the input image data may be displayed using a mask for optically distinguishing between imageable and non-imageable regions in accordance with the imaging format of the imaging unit, as a gray-scale image on a monitor. In other words, a softproof of the large record of input image data is created on a monitor, in particular of the raster image processor. On the basis of the softproof, an operator may select the desired section (or trimmed section) of the signature, which may then be specified for the further process steps in the raster image processor. The signature may be rasterized in the thus defined section, for example for imaging in a direct on-press imaging print unit. In particular, the signature of input image data may be displayed at a reduced resolution. In one advantageous specific embodiment, the geometric parameters of the section to be processed may be modified by shifting the mask used for optically distinguishing between imageable and non-imageable regions in accordance with the imaging format.

It is advantageous when the geometric parameters are input via an interface, such as a keyboard or a computer mouse. Alternatively thereto, for a number of different imaging units, a number of records of geometric parameters may also be stored in a table, so that, as a function of the identification of an imaging unit, the record of the identified imaging unit is retrieved for the processing. In other words, records of geometric parameters may be stored in the raster image processor for a plurality of imaging units of different imaging formats, so that, in response to specification of the imaging unit to be used, the raster image processor may use the corresponding record.

The geometric parameters may include at least one reference point or point of origin, and linear dimensions of the image in at least two linearly independent directions of the imaging area.

Also provided in the context of the inventive idea is a raster image processor, which is suited for implementing the method of the present invention in accordance with this description. The raster image processor includes a raster-image-processor program, which has at least one section, in which geometric parameters for defining the section to be processed, are assigned to input variables for the rasterization.

The raster-image-processor program may also be stored on a storage medium, in particular a portable storage medium, such as a magnetic disk, an optical CD or DVD, a magneto-optical storage medium or the like. In other words, a storage medium in accordance with the present invention is distinguished by a raster-image-processor program stored on the storage medium, for implementing the method of the present invention in accordance with this description, the program including at least one section, in which geometric parameters for defining the section to be processed, are assigned to input variables for the rasterization.

The raster image processor may be part of a control unit of an imaging device for printing forms. The imaging device may be part of a printing-form imagesetter or of a direct on-press imaging print unit. A printing press in accordance with the present invention has a direct on-press imaging print unit having an imaging device in accordance with the present invention. The printing press may be a web-processing or a sheet-processing press. Typical printing substrates include paper, cardboard, carton, organic polymer sheeting or fabric, or the like. A sheet-processing printing press may have a feeder, a plurality of print units, a delivery unit, and optionally at least one surface-finishing unit, for example a punching unit or a varnishing system. A web-processing printing press may include an automatic reelchange, a plurality of printing towers, each having upper and lower print units, a dryer, and a folder.

U.S. Pat. No. 6,029,576, which describes a printing press with a raster image processor, is hereby incorporated by reference herein.

BRIEF DESCRIPTION OF THE DRAWINGS

Further advantages, advantageous embodiments and refinements of the present invention are described on the basis of the following figures, as well as their descriptions, each of which show.

DETAILED DESCRIPTION

Figure 1:
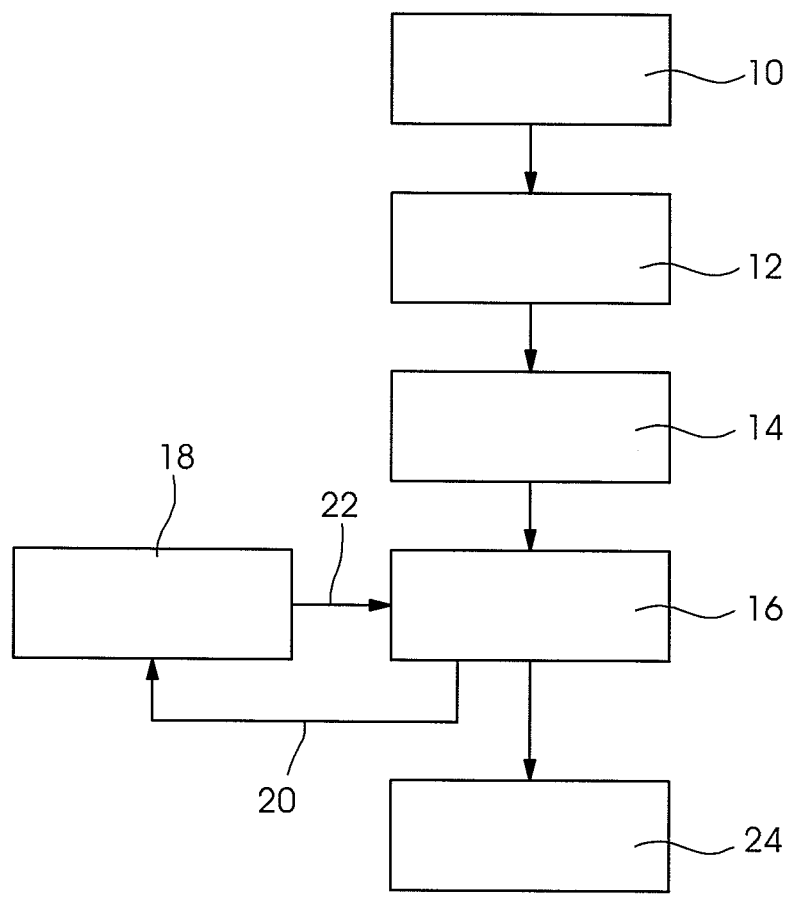
FIG. 1 a flow chart of one preferred specific embodiment of the method according to the present invention for generating digital imaging data for an imaging unit.

FIG. 1 is a flow chart of a preferred specific embodiment of the method according to the present invention for generating digital imaging data for an imaging unit. A complete signature of input image data is prepared in a large computer-to-plate format, i.e., for the complete surface of a printing form (step 10), and is fed to the raster image processor. Using a postscript interpreter, the signature is interpreted at a reduced resolution (step 12), enabling it to be displayed as a gray-scale image, thus not rasterized, on the monitor of the raster image processor (step 14). This gray-scale image may also be described as a softproof. It is independent of the imaging format of the imaging unit, such as a direct on-press imaging print unit in particular, provided for imaging the printing form. The regions, which extend beyond the maximum imaging format of the imaging unit, are visibly marked in color, by a mask using a superposed gray-scale value, or by an overlaid pattern. The maximum possible imaging format is stored in the raster image processor. At this point, the desired, required section or trim section, more specifically the position of a section, which, at most, has the dimensions of the maximum possible imaging format, is defined (step 16). The geometric parameters of the section, in particular its position and/or dimensions, may be stored for recurrent or similar signatures in the raster image processor (step 18). In this context, different records of geometric parameters may be stored for various imaging units and imaging formats, respectively. Once the definition is made in step 16, the specific geometric parameters may be stored (memory operation 20). If a record of geometric parameters is stored in the imaging unit, then this may also be automatically assigned to a signature (read operation 22), when it is necessary to define the section to be imaged for this signature. The specified section of the current signature is interpreted for the highly resolved output of the imaging unit provided and processed into a raster image (step 24).

Figure 2:
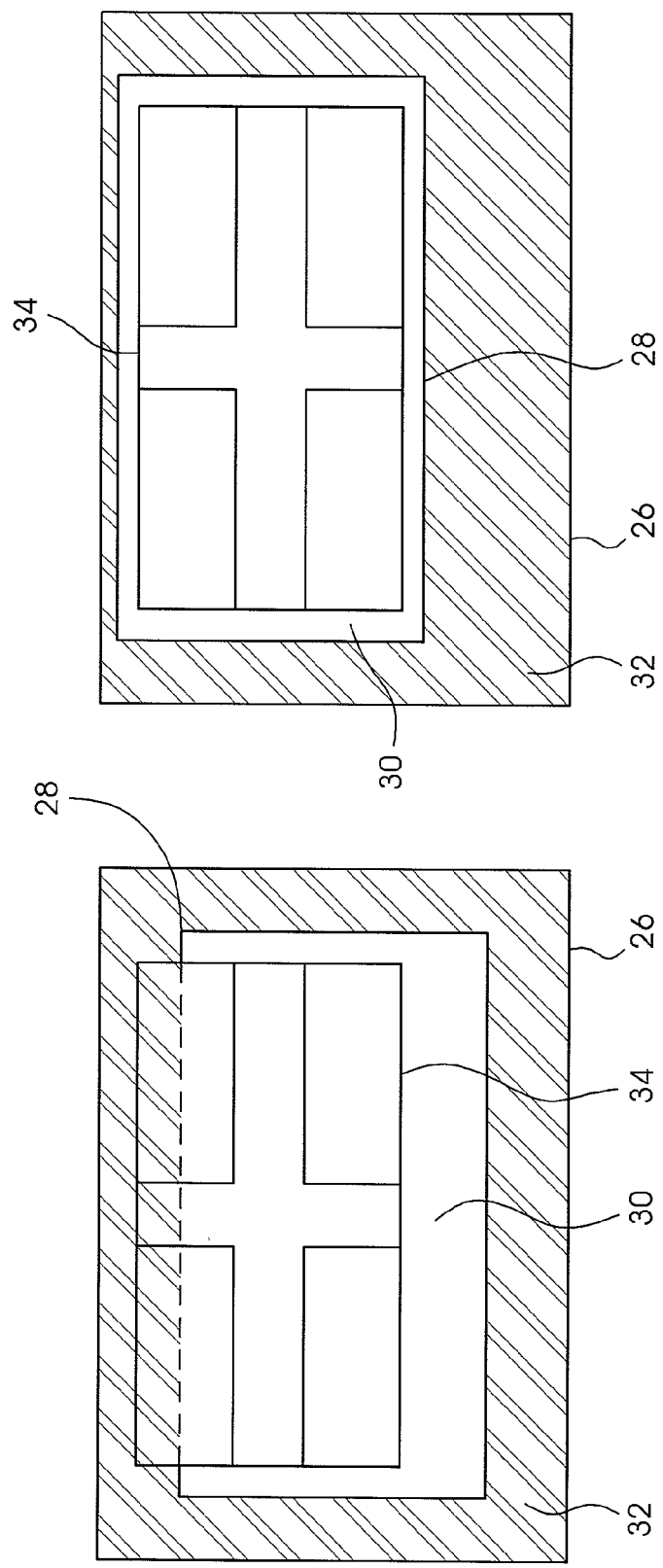
FIG. 2 in two partial images, the position of a mask for optically differentiating between imageable and non-imageable regions in accordance with the imaging format of the imaging unit, over a large signature, on a monitor.

In two partial images, FIG. 2 shows the position of a mask for optically differentiating between imageable and non-imageable regions in accordance with the imaging format of the imaging unit, over a large signature (complete area of a printing form), on a monitor. A large signature 26 is displayed as a gray-scale image on the monitor. A mask 28 having an imageable region 30 and a non-imageable region 32 is superposed on the gray-scale image. In other words, the regions which extend beyond the maximum imaging format (imageable region 30) are visibly marked. The first partial image in the left half of FIG. 2 shows how the non-imageable region 32 overlaps a portion of image area 34 to be printed. The position of the mask on the monitor may now be interactively changed by the operator: The section or trim section of the partial area of the large signature may be specified or defined by using a computer mouse to outline a partial area on the monitor, or by using a keyboard to input precise dimensional details. The second partial image in the right half of FIG. 2 shows how, by defining the section, the position of imageable region 30 is shifted, with the result that image area 34 to be printed is now situated in its entirety in imageable region 30. The thus defined section is subjected to a rasterization in the further processing.

REFERENCE NUMERAL LIST 10 interpreting input image data
12 interpreting at a low resolution
14 displaying on the monitor
16 defining the section
18 storing the geometric parameters
20 storing operation
22 read operation
24 processing the defined section at a high resolution
26 large signature
28 mask
30 imageable region
32 non-imageable region
34 image surface

What is claimed is:

1. A method for generating digital imaging data for an imaging unit, the digital imaging data are defined from a signature of input image data, the method comprising the steps of:
defining a section of the signature corresponding to an imaging format of the imaging unit as a function of geometric parameters of an image area of the input image data, a further section of the signature corresponding to an area outside the imaging format thereby also being defined; and
processing the section of the signature into a raster image by a raster image processor, while the further section remains unprocessed by the raster image processor.

2. The method as recited in claim 1 wherein the geometric parameters are stored in the raster image processor.

3. The method as recited in claim 1 further comprising displaying the input image data as a gray scale image on a monitor using a mask for optically distinguishing between imageable and non-imageable regions in accordance with the imaging format of the imaging unit, the imageable region corresponding to the section and the non-imageable region corresponding the further selection.

4. The method as recited in claim 1 further comprising inputting the geometric parameters via an interface.

5. The method as recited in claim 1 further comprising storing in a table a plurality of records of geometric patterns for a plurality of different imaging units, and retrieving, as a function of an identification of the imaging unit, a first record of the plurality of records, the first record corresponding to the identified imaging unit.

6. The method as recited in claim 3 wherein the signature of the input image data is displayed at a reduced resolution.

7. The method as recited in claim 3 further comprising modifying the geometric parameters of the section to be processed by shifting the mask used for optically distinguishing between imageable and non-imageable regions in accordance with the imaging format.

8. The method as recited in claim 1 wherein the geometric parameters include at least one reference point and linear dimensions of the image in at least two linearly independent directions of the imaging area.

9. A raster image processor comprising a raster-image-processor program for implementing the method as recited in claim 1, the raster-image-processor program having at least one step including assigning the geometric parameters to input variables for the rasterization.

10. A non-transitory storage medium comprising a raster-image-processor program stored on the storage medium for implementing the method as recited claim 1, the raster-image-processor program having at least one step including assigning the geometric parameters to input variables for the rasterization.

11. An imaging device for printing forms comprising a control unit having a raster image processor as recited in claim 9.

12. A printing-form imagesetter comprising the imaging device as recited in claim 11.

13. A direct on-press imaging print unit comprising the imaging device as recited in claim 11.

14. A printing press comprising a direct on-press imaging print unit as recited in claim 13.

15. A method for generating digital imaging data for an imaging unit, the digital imaging data are defined from a signature of input image data, the method comprising the steps of:
selecting an imageable region of the signature corresponding to an imaging format of the imaging unit, a nonimageable section of the signature corresponding to an area outside the imageable region thereby being defined; and
processing the imageable region of the signature into a raster image by a raster image processor, while the non-imageable section remains unprocessed by the raster image processor.

* * * * *